United States Patent
Showell

(10) Patent No.: US 6,473,005 B2
(45) Date of Patent: Oct. 29, 2002

(54) MARINE SIGNALING DEVICE

(76) Inventor: Evan A. Showell, 12 N. Maple Ave., Long Valley, NJ (US) 07853

( * ) Notice: Subject to any disclaimer, the term of this patent is extended or adjusted under 35 U.S.C. 154(b) by 0 days.

(21) Appl. No.: 09/782,990

(22) Filed: Feb. 14, 2001

(65) Prior Publication Data

US 2002/0109586 A1 Aug. 15, 2002

(51) Int. Cl.[7] .............................................. G08B 23/00
(52) U.S. Cl. ...................... 340/984; 114/270; 116/26; 700/83
(58) Field of Search ................................ 340/984, 475; 440/1, 84; 701/21; 116/26, 24, 19, 18; 114/270; 362/477; 700/83

(56) References Cited

U.S. PATENT DOCUMENTS

| | | | |
|---|---|---|---|
| 2,252,849 A | | 8/1941 | Hammond, Jr. ............. 177/329 |
| 3,007,135 A | * | 10/1961 | Marr ......................... 340/984 |
| 3,786,498 A | | 1/1974 | Lipe |
| 4,213,116 A | * | 7/1980 | Holtzman et al. |
| 4,333,071 A | | 6/1982 | Kira ........................ 200/61.31 |
| 5,012,757 A | | 5/1991 | Williams ..................... 116/19 |
| 5,072,362 A | | 12/1991 | Lilienthal .................... 340/984 |
| 5,285,113 A | * | 2/1994 | Schlich ...................... 307/10.1 |
| 5,448,234 A | * | 9/1995 | Harwood .................... 340/984 |
| 5,636,916 A | * | 6/1997 | Sokolowski ................ 340/984 |
| 6,126,299 A | * | 10/2000 | Hypes et al. ................ 340/985 |

* cited by examiner

Primary Examiner—Brent A. Swarthout
(74) Attorney, Agent, or Firm—Duane Morris LLP

(57) ABSTRACT

A signaling device for marine vessels that is functionally and operationally similar to the directional devices (i.e., turn signal devices) found in automobiles including an actuating means selectively connectable to a sound source that is connected to a sound controller, and to a light source that is connected to a light controller. The actuating means of the present invention has the same look, feel, and is operated in the same manner as those provided in an automobile. The present invention thus reduces the dependency of the vessel operator on his or her memorization of the applicable required sound and optional light maneuvering signals for operation of the vessel in inland and international waters while at the same time helping to ensure that the required signals are given. The operator of a marine vessel equipped with the present invention can easily, consistently, and accurately indicate a variety of maneuvering intentions to other proximate marine vessels by simply moving a directional signal lever up or down, or by depressing a single button. With the present invention, safe marine vessel operation is significantly increased because the operator need only know how to actuate a directional signal or depress a button to provide the required and proper maneuvering signal.

20 Claims, 6 Drawing Sheets

MARINE SIGNALING DEVICE

BACKGROUND OF THE INVENTION

1. Field of the Invention

The present invention relates to signaling devices for marine vessels and more particularly, to a signaling device for a marine vessel that is substantially similar to an automobile directional signaling device in look and feel

2. Description of the Prior Art

Every year boating accidents cause hundreds of thousands of dollars worth of property damage and result in numerous instances of personal injury and death. These accidents oftentimes result from a vessel operator's failure to provide the correct, or even any, signal upon maneuvering on the water. Even experienced operators may fail to provide proper signals of maneuvering actions and intentions due to the configuration of the signaling devices. The audible signal is generally located off of the steering column of the vessel, requiring the operator to remove his or her hands from the steering wheel to actuate the signal. Visual signaling devices, if used, are oftentimes positioned off the steering column, but in a different location than the sound signal. This creates a safety hazard as the operator's attention is diverted from maneuvering of the boat during actuation of these signals.

Persons experienced with operating marine vessels recognize the practical importance of providing advance notice of course changes and intentions to other proximately located vessels, as well as the legal requirement to provide such advance notice via certain prescribed signals. Navigational rules, such as those established by the United States Coast Guard for inland navigation (the "Inland Rules") and other rules for international navigation (COLREGS), delineate the precise required audible and optional visual signals for various vessel maneuvers. Notwithstanding that vessel operators are legally chargeable with knowledge of the "rules of the road," including giving the prescribed signals as required, the less experienced vessel operator may not memorize the myriad maneuvering signals and consequently, either may fail to provide a maneuvering signal or may provide an incorrect maneuvering signal. The danger attendant with failing to notify other vessels of a maneuver, or with giving an incorrect signal, is obvious. Moreover, should a collision occur, there may be legal fault assessable against the operator of a vessel who fails to provide the proper maneuvering signal or who provides an incorrect signal.

There thus exists a need in the art for a signaling device that permits even the novice vessel operator to provide the correct audible and/or optional visual maneuvering signal safely, easily, reliably, and without requiring memorization of the various maneuvering signals or without having to refer to the voluminous regulations directed to vessel operation. It would also be desirable if the signaling device could provide a myriad of different signals to accommodate different visibility conditions and both the Inland Rules and offshore navigation COLREGS.

SUMMARY OF THE INVENTION

In accordance with the present invention, there is provided a marine signaling device having (a) a sound source; (b) a light source; (c) a directional actuator movable to a first position to indicate a first vessel maneuver and to a second position to indicate a second vessel maneuver; (d) a sound controller selectively connectable to the sound source and to the directional actuator, the sound controller generating a first sound signal when the directional actuator is moved to said first position and generating a second sound signal when the directional actuator is moved to the second position; (e) a light controller selectively connectable to the light source and to the directional actuator, the light controller generating a first light signal when the directional actuator is moved to the first position and generating a second light signal when the directional actuator is moved to the second position; and (f) separate port and starboard maneuvering indicators designed for overtaking situations where such indicators are selectively connectable to the sound and light controllers such that a vessel operator overtaking another vessel to either port or starboard may depress the corresponding overtaking indicator to generate a predetermined sound and light signal due to the interconnection of the overtaking actuator switch and the sound and light signaling sources.

In addition to the directional and overtaking actuators, the present invention may consist of arrangements of actuators, sound signaling and light signaling devices in combination with one another so as to allow the equipped vessel easily to give the appropriate audible and optional visual signal in a variety of different circumstances such as, by way of non-limiting example, operating astern propulsion, danger, distress, towing, reduced visibility and the like.

The signaling device may be designed with an automobile-like interface, such as a steering wheel with a steering column mounted directional lever or the like. Such an interface is well known to the vast majority of the automobile driving public, and as such, enhances the ease of use of the present invention.

Advantageously, the light source and the sound source of the signaling device may be synchronously actuated to effectuate a combination light and sound signal in accordance with the Inland Rules and COLREGS. A further benefit is afforded in that the signaling device of the present invention automatically switches from Inland Rules to COLREGS in the appropriate locations at sea due to an interlink between the signal device and the vessel's positioning system.

In accordance with the present invention, the marine maneuvering signal generally comprises a combination sound and light signal. For example, when a first marine vessel overtakes a second marine vessel on the starboard side of the second marine vessel, the operator of the first marine vessel may depress the starboard overtaking maneuvering actuator of the present invention to generate predetermined sound and light signals in accordance with either Inland Rules or COLREGS.

Thus, to overtake a second marine vessel on the overtaken vessel's starboard side following Inland Rules, a first marine vessel may depress the starboard side overtaking maneuvering actuator of the present invention to generate a combination sound and light signal consisting of one short horn blast having a duration of approximately one second together with a simultaneous light signal that is equivalent in duration to the short horn blast. When overtaking a second marine vessel on the overtaken vessel's starboard side in accordance with COLREGS, a first marine vessel may depress the starboard side overtaking maneuvering actuator of the present invention to generate a sound signal consisting of two prolonged horn blasts each having a duration of approximately four to six seconds immediately followed by one short horn blast having a duration of approximately one second together with a simultaneous light signal that is equivalent in number and duration to the prescribed sound signals.

Likewise, the signaling device of the present invention generates marine maneuvering signals to indicate-that a first vessel is overtaking a second vessel on the port side of the second vessel. The port side overtaking maneuver is generated by depressing the port side maneuvering actuator thus actuating a sound signal in accordance with Inland Rules, which is comprised of two short horn blasts, accompanied by a light signal that is equivalent in number and duration to the sound signals. The port side overtaking signal in accordance with COLREGS may be generated by depressing the port side overtaking maneuvering actuator to effectuate a signal that consists of two prolonged horn blasts and two short horn blasts, each prolonged blast having a duration ranging from about four to six seconds and each short blast having a duration of approximately one second, accompanied by a synchronous light signal that is equivalent in number and duration to the sound signals.

Accordingly, the overtaking maneuvering actuator of the present invention advantageously allows a marine operator to effortlessly generate the proper, required marine sound and optional light signals necessary when a first marine vessel overtakes a second marine vessel on the starboard or port side of the second marine vessel.

In addition to the overtaking actuator, the present invention also consists of a maneuvering directional actuator. The maneuvering directional actuator is analogous in function to the directional on an automobile and is used to signal the equipped vessel's maneuvering intention or action through a series of generally-recognized, predetermined signals. In the preferred embodiment those signals will conform to the then-operative Inland Rules or COLREGS-prescribed maneuvering signals although for the purposes of the present invention such maneuvering directional signals need not so conform.

Thus, to indicate a course change, or intended course change (depending upon whether one is operating pursuant to Inland Rules or COLREGS) to starboard by the vessel equipped with the present invention pursuant to Inland Rules, the equipped vessel may move the maneuvering directional actuator to a first position to generate a combination sound and light signal consisting of one short horn blast having a duration of approximately one second together with a synchronous light signal of approximately equivalent duration. When altering course to starboard pursuant to COLREGS, the equipped vessel may move the maneuvering directional actuator to a first position to generate a combination sound and light signal consisting of one short blast having a duration of approximately one second together with a simultaneous light signal that is equivalent in duration to the sound signal.

To indicate a course change to port by the vessel equipped with the present invention pursuant to Inland Rules, the equipped vessel may move the maneuvering directional actuator to a second position to generate a combination sound and light signal consisting of two short horn blasts each having a duration of approximately one second together with an equivalent number of simultaneous light signals of approximately equivalent duration to the sound signals. When altering course to port pursuant to COLREGS, the equipped vessel may move the maneuvering directional actuator to a second position to generate a combination sound and light signal consisting of two short horn blasts having a duration of approximately one second each together with simultaneous light signals equivalent in number and duration to the sound signals.

In addition to the overtaking and maneuvering signals, the marine signaling device may further include a danger section for use in danger situations which is capable of generating a danger sound signal of five short horn blasts, each having a duration of approximately one second, and a danger light signal equivalent in number and duration and synchronous to the danger sound signal. Danger situations most likely involve avoiding a collision between a first marine vessel and a second marine vessel or warning a second marine vessel that it is approaching or encountering danger. The danger section addresses this situation by providing a means to effectuate the danger sound and light signal in danger situations quickly and easily by simply depressing the danger actuator.

In another aspect of the present invention there is provided a distress section for use in distress situations which is capable of generating a distress light signal which is actuated from about fifty to seventy times per minute. Distress situations include, by way of non-limiting example, imminent loss of life of a marine vessel passenger, imminent loss of the marine vessel itself, or serious injury to a person on the marine vessel. Advantageously, the distress section provides a means to quickly, easily and effectively generate a distress signal, notifying other marine vessels and even the U.S. Coast Guard of a distress situation.

In yet another aspect of the present invention, there is provided a stern propulsion section. When a first marine vessel is operating astern propulsion, the signaling device automatically generates a stern propulsion sound signal having three short horn blasts of approximately one second duration and a synchronous light signal which is equivalent in number and duration to the stern propulsion sound signal. Oftentimes a marine vessel operator may forget to actuate an astern propulsion signal or even may forget that an astern propulsion signal is required. The stern propulsion section of the present invention advantageously puts other marine vessels on notice of the intentions and maneuvers of the signaling vessel.

The present invention also provides a restricted visibility section for use in restricted visibility situations. The restricted visibility section is selectively connectable to the sound and light controller of the present signaling device so that a wide variety of restricted visibility signals may be generated according to the specific situation. In addition, the present signaling device may also provide a photosensor that automatically generates a restricted visibility signal as well as a manual switch to generate a restricted visibility signal. The restricted visibility signal may be automatically canceled by the photosensor at the end of the restricted visibility situation or, the signal may be canceled manually by depressing the manual switch. Advantageously, the restricted visibility section provides a means for the marine vessel operator to ensure proper signaling while in a restricted visibility marine environment, ultimately providing a safe setting for all marine operators, passengers and vessels.

The present invention may additionally provide a towing section and an anchoring section for use in towing and anchoring situations, respectively. These sections advantageously provide marine operators with the ability to quickly, effectively and safely generate the proper sound and light signals required in towing and anchoring situations.

Accordingly, the marine signaling device of the present invention provides a quick and effective way to generate the proper marine required sound and optional light signals for vessel maneuvering, danger, distress, restricted visibility, towing and anchoring, ultimately providing a safer marine environment. Safety also is enhanced by use of the optional light signals in conjunction with the required sound signals as opposed to a signaling regime in which only the required sound signals are given.

All aspects of the present signaling device also serve to teach new marine operators the correct required audible and optional visual signals for maneuvering a marine vessel, danger situations, distress situations, restricted visibility conditions, towing situations, anchoring situations and the like. Thus, the present invention advantageously serves as a teaching device because, as the correct marine signals are used, they will become well known and recognizable by vessel operators and passengers alike. Such frequent use of correct signals advantageously serves to enhance the overall safety in a marine environment.

BRIEF DESCRIPTION OF THE DRAWINGS

The invention will be more fully understood and further advantages will become apparent when reference is made to the following detailed description of the preferred embodiments of the invention and the accompanying drawings in which.

DETAILED DESCRIPTION OF THE INVENTION

The present invention relates to a signaling device for a marine vessel having directional levers and switches to provide proper marine maneuvering signals. Generally stated, the signaling device of the present invention comprises a sound source; a light source; a directional actuator movable to a first position to indicate a first vessel maneuver and to a second position to indicate a second vessel maneuver; a sound controller selectively connectable to the sound source and to the directional actuator, the sound controller generating a first sound signal when the directional actuator is moved to the first position and generating a second sound signal when the directional actuator is moved to the second position; and a light controller selectively connectable to the light source and to the directional actuator, the light controller generating a first light signal when the directional actuator is moved to the first position and generating a second light signal when the directional actuator is moved to the second position as well as additional steering-wheel mounted, depressable, port and starboard overtaking actuators which actuators are also connected to a sound source and light source generating a first overtaking signal when the port actuator is depressed and a second overtaking signal when the starboard actuator is depressed.

The signaling device is advantageously situated like a car dashboard so that automobile operators are readily familiar with the device set up, providing easy and quick deployment of signals. Thus, the signaling device of the present invention provides a vessel operator with the means to safely, easily and reliably generate the proper sound and or light signal necessary for proper vessel maneuvering within marine Inland Rules or COLREGS, i.e., international navigation rules, in danger situations, in distress situations, when operating astern propulsion, in reduced visibility conditions, in anchoring situations and or in towing situations. Moreover, the present invention serves to teach vessel operators the required sound and optional light signals used in connection with certain vessel maneuvers and other situations that may arise when operating a vessel, as repeated use of the signaling device will allow the vessel operator and passengers, if any, to associate required audible and optional visual signals with various situations and maneuvers encountered while operating or riding in a vessel.

Figure 1:
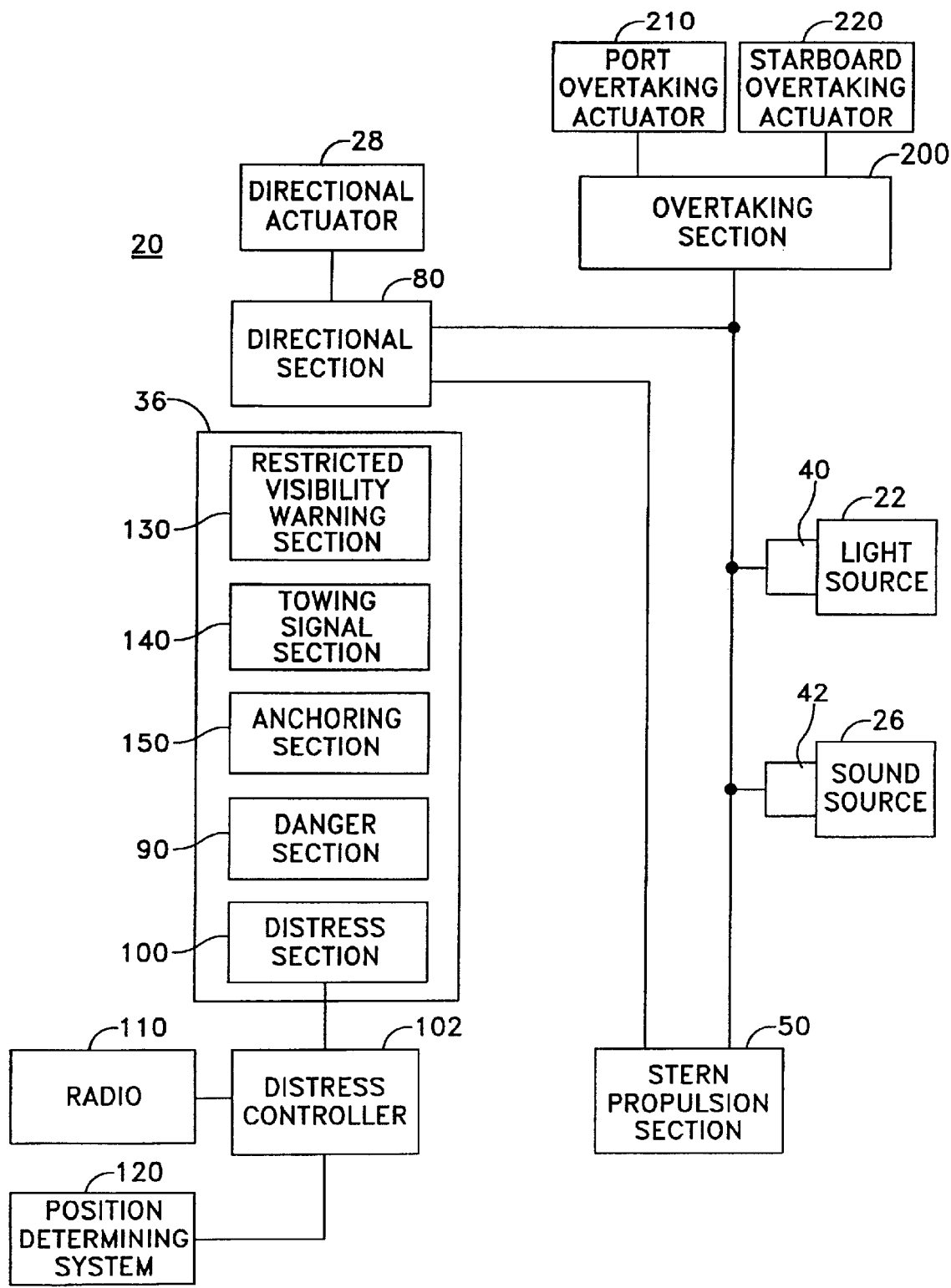
FIG. 1 is a schematic block diagram of a signaling device for a marine vessel in accordance with the present invention.

The invention can be more fully understood from the following description in connection with the appended drawings. Turning now to FIG. 1 of the drawings there is shown a schematic block diagram of the signaling device 20 for a marine vessel. Broadly stated, the signaling device 20 comprises a sound source 26, a light source 22 and a directional section 80 with a directional actuator 28 and an overtaking section 200 with a port overtaking actuator 210 and a starboard overtaking actuator 220. The signaling device 20 may also include a danger section 90, a distress section 100, a stern propulsion section 50, a restricted visibility warning section 130, a towing signal section 140 and an anchoring section 150.

The sound source 26 may comprise a sound generating device or system suitable for producing sound signals in accordance with the present invention. Preferably, sound source 26 is selected from the group consisting of a piezoelectric horn, pneumatic horn, whistle, bell and gong.

Sound controller 42 may comprise electronic devices and components for generating and providing a plurality of predetermined signals to the sound source 26. These devices and components may include a microcontroller which may store a plurality of predetermined sound signals, receive an input signal from the various sections of the signaling device 20, determine from which section; for example, directional section, danger section, distress section, stern propulsion section, reduced visibility section, towing section or anchoring section, the signal was received, and generate a control signal for the sound source 26 in response to the received signal. Sound controller 42 may also include interface circuitry and devices for connecting sound controller 42 to sound source 26 and switches and actuators provided in the aforementioned sections of the signaling device 20, and which are well known to individuals skilled in the art.

Light source 22 may comprise a white, yellow or other color light. Light source 22 preferably comprises an all-around white light having a 360° degree viewing visibility which is visible at a distance of at least five miles. Preferably, light source 22 is located in the same fore and aft vertical plane as the masthead lights of the marine vessel at least one-half meter vertically above the forward masthead light in a vessel equipped with fore and aft masthead lights. These specific placement requirements comply with navigation rules and regulations available or known to individuals skilled in the art but it is not a prerequisite to the present invention that such placement so comply. In an alternative arrangement, signaling device 20 includes a light source 22 comprising a plurality of colors which may be located in any number of different positions on the marine vessel.

Light controller 40 generally comprises electronic devices and components for generating and providing a plurality of predetermined signals to the light source 22, and are well known to a skilled artisan. These may include for example, a microcontroller which stores the plurality of predetermined light signals, receives an input signal from the various sections of the signaling device 20, determines from which section the signal was received, and generates a control signal for the light source 22 in response to the received signal. Light controller 40 may also include interface circuitry and devices for connecting the light controller 40 to the light source 22. It is anticipated that the specific components and devices that comprise the light controller 40 may be constructed in various configurations to provide the functionality required by the present invention.

Figure 2:
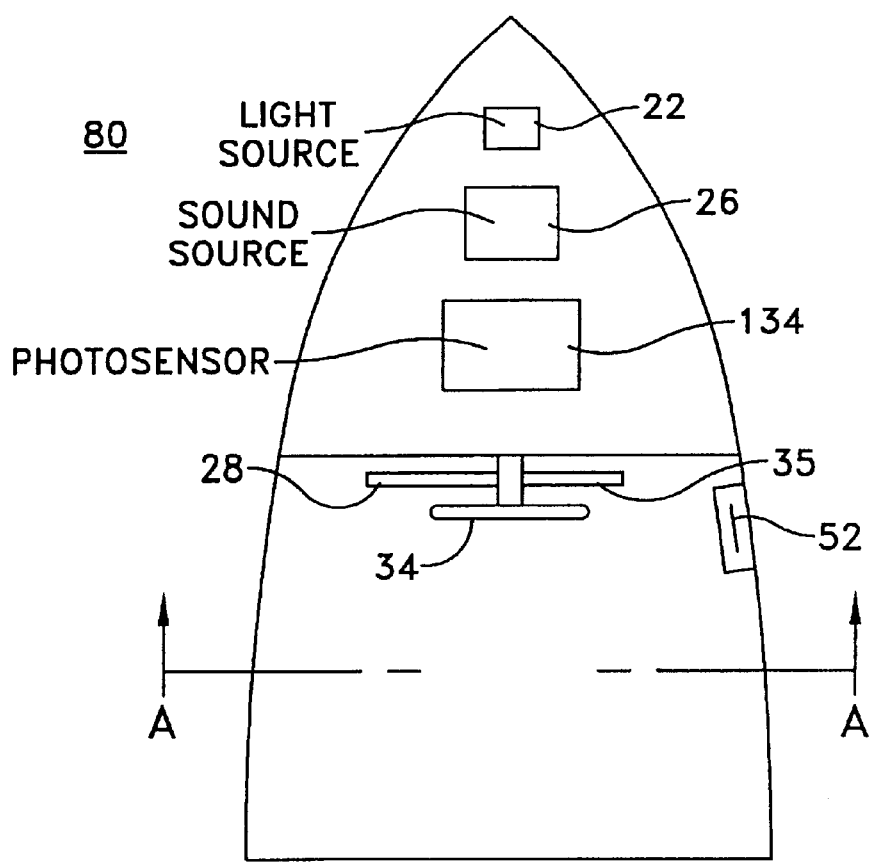
FIG. 2 is a diagrammatic top view of a marine vessel having a signaling device in accordance with the present invention.
Figure 3:
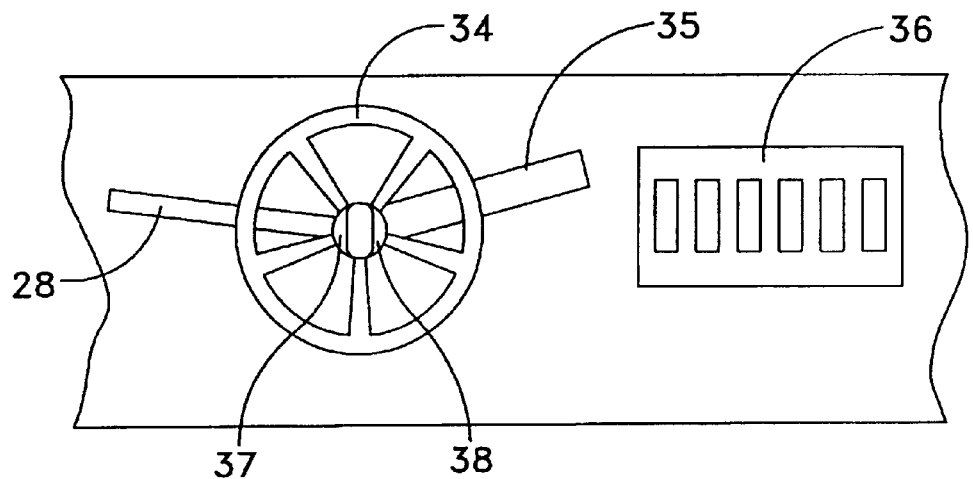
FIG. 3 is a front-view of a dashboard of the marine vessel as viewed along the line A—A of FIG. 2.
Figure 4:
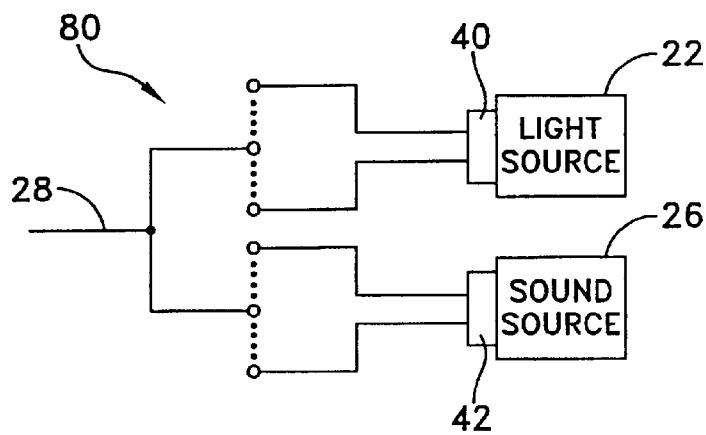
FIG. 4 is a schematic block diagram of the directional section of the signaling device of the present invention.

Turning now to FIGS. 2, 3 and 4, there is shown the directional section 80 of the signaling device 20. A directional actuator 28 extends from a steering column (not shown) that supports a steering wheel 34. The directional actuator 28 is movable in an up and down direction from a neutral position to at least two actuating positions. The directional actuator 28 may be used to generate the signals necessary to effectuate safe marine vessel maneuvers. For example, the directional actuator 28 is movable to a first position to indicate a first vessel maneuver and to a second position to indicate a second vessel maneuver. The signaling device 20 may synchronously actuate the light source 22 and the sound source 26 so that when the directional actuator 28 is moved, light and or sound signals may be actuated according to the vessel maneuver.

Various combinations of signals may be actuated according to the vessel maneuver. Generally, the sound controller 42 generates a first sound signal when the directional actuator 28 is moved to the first position and generates a second sound signal when the directional actuator 28 is moved to the second position. Similarly, the light controller 40 generates a first light signal when the directional actuator 28 is moved to the first position and generating a second light signal when the directional actuator 28 is moved to the second position. Thus, the signaling device 20 advantageously generates the signals necessary to indicate to another proximately located vessel when a maneuver is intended by a marine vessel. When overtaking the starboard side of a proximately located vessel, the operator of the passing marine vessel moves the directional actuator 28 to the first position, in an upward direction. The sound controller 42 and the light controller 40 detect the movement of the directional actuator 28 to the first position and generate predetermined sound and light signals that are communicated to the sound source 26 and the light source 22. In one embodiment, the sound source 26 and light source 22 are synchronously actuated and provide a signal in accordance with Inland Rules of the marine vessel 10 which comprises a first sound signal consisting of one short blast having a duration of approximately one second, and a first light signal approximately equivalent in duration to first sound signal. Alternatively, the signaling device 20 operates in accordance with COLREGS, actuating a second sound signal comprising two short blasts each having a duration of approximately one second, and a synchronously actuated second light signal that is approximately equivalent in duration to said second sound signal. Advantageously, the signaling device 20 is configured with the appropriate hardware (i.e., microprocessors, and the like) which enable the signaling device to switch automatically between Inland Rules and COLREGS depending on the vessel's then-current position.

Thus, the operator of the marine vessel indicates a maneuver to the starboard side of another proximately located vessel simply by moving the directional actuator 28 up and into the first position. As long as the directional actuator 28 is in the first position, the predetermined sound and light signals directed to a starboard maneuver will repeat at a prescribed interval of approximately 10 seconds. The sound and light signals may be canceled by moving the directional actuator 28 from the first position to the neutral position. They will also self-cancel when the equipped vessel's steering wheel is returned to a central position.

To indicate a maneuver to the port side of the proximate vessel, the operator of the marine vessel would move the directional actuator 28 in a downward direction to a second position. In the second position, the sound controller 42 and the light controller 40 detect the movement of the directional actuator 28 and generate predetermined sound and light signals that are communicated to the sound source 26 and the light source 22. The predetermined sound signal in accordance with Inland Rules comprises a first sound signal consisting of two prolonged blasts and one short blast, each prolonged blast having a duration ranging from about four to about six seconds and each short blast having a duration of approximately one second, and a first light signal that is approximately equivalent in duration to and is synchronously actuated with the first sound signal.

Alternatively, to indicate a maneuver to the port side of the proximate vessel in accordance with COLREGS, the operator of the marine vessel would move the directional actuator 28 in a downward direction to a second position, actuating a second sound signal comprising two prolonged blasts and two short blasts of said sound source 26, each prolonged blast having a duration ranging from about four to about six seconds and each short blast having a duration of approximately one second, and a synchronous second light signal that is approximately equivalent in duration to said second sound signal. As long as the directional actuator 28 is in the second position, the predetermined sound and light signals will repeat at an interval of approximately 10 seconds. These signals may be canceled by moving the directional actuator 28 from the second position to the neutral position. The signals will self-cancel when the marine vessel's steering wheel 34 is returned to a central position. It will be apparent to one skilled in the art that, although the indicated sound and light signals comply with both Inland Rules and COLREGS such compliance is not a requirement of the present invention and thus, any predetermined and generally-understood set of signals may be communicated by the present invention, not merely those signals prescribed by the Inland Rules and COLREGS.

In FIG. 3 there is shown a section actuator 35 extending from the steering column, adjacent to the steering wheel 34. The section actuator 35 comprises a plurality of depressable switches that serve to actuate the danger section 90, distress section 100, stern propulsion section 50, restricted visibility section 130, towing section 140 and or anchoring section 150 of the signaling device 20. Preferably, section actuator 35 also includes depressable switches thereon to actuate the restricted visibility, towing and anchoring sections, 130, 140 and 150 respectively.

Figure 8:
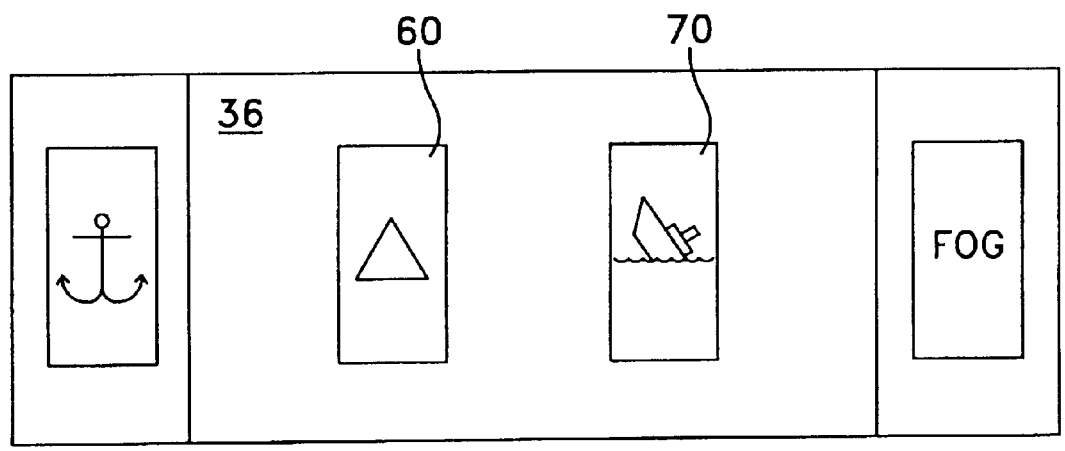
FIG. 8 is a front view of the control panel of the signaling device of the present invention.

FIG. 3 additionally shows a control panel 36 located adjacent to steering wheel 34 and having a plurality of depressable switches to actuate danger section 90, distress section 100, stern propulsion section 50, restricted visibility section 130, towing section 140 and/or anchoring section 150 of signaling device 20. Preferably, control panel 36 includes depressable switches thereon to actuate danger section 90, distress section 100 and stern propulsion section 50, restricted visibility section 130, towing section 140 and anchoring section 150. Even more preferably, each depressable switch includes a picture, symbol or text thereon indicating the specific function of the depressable switch. For example, in FIG. 8 there is shown the danger section 90 switch having a triangle thereon and the distress section 100 switch having a picture of a sinking ship.

Figure 5:
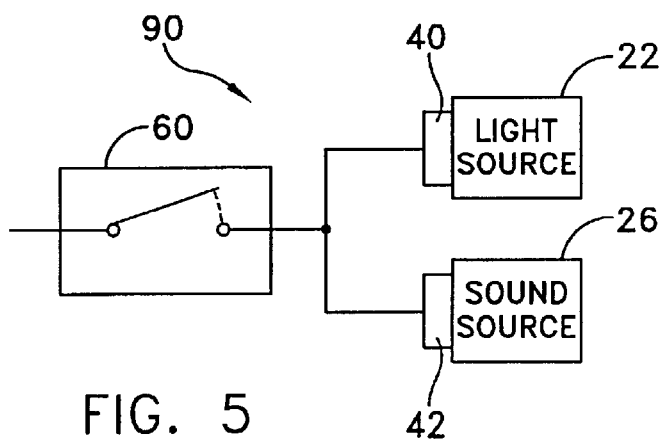
FIG. 5 is a schematic block diagram of the danger section of the signaling device of the present invention.

Turning now to FIG. 5, there is shown a schematic block diagram of a danger section 90 of signaling device 20. A signaling device 20 having a danger section 90 advantageously enables an operator of a marine vessel to generate a danger signal to avoid a collision between the marine vessel and another proximate vessel, to warn another proximate vessel of impending danger that the proximate vessel may encounter, or to warn another proximate vessel that the marine vessel is approaching or encountering danger. As is seen, the danger section 90 of signaling device 20 comprises a danger actuator 60 selectively connectable to sound controller 42 and to light controller 40 and thus is capable of generating a danger sound signal and a danger light signal. In one embodiment, danger actuator 60 is manually depressable via any type of depressable device such as a rocker switch, a momentary switch, a membrane switch, and the like, and is located on selection actuator 35 next to steering wheel 34. Preferably, danger actuator 60 is a depressable device such as a rocker switch, momentary switch or membrane switch located on control panel 36. In accordance with the present invention, the danger sound signal comprises five short horn blasts, each having a duration of approximately one second, and a danger light signal synchronously actuated and approximately equivalent in duration to the danger sound signal.

Oftentimes marine vessel operators are familiar with Inland Rules but have not memorized the entire rule handbook. Additionally, marine vessel operators frequently operate their boats on a seasonal basis, increasing the likelihood that the proper rules and signals may be forgotten from the season prior. The danger section of the present signaling device advantageously incorporates the correct Inland Rules and COLREGS danger signal, offering marine vessel operators a quick and effective means to generate a danger signal. As such, this feature promotes safety in a marine environment among marine vessels.

In another embodiment, signaling device 20 further comprises a distress section 100 for use in distress situations such as an imminent loss of life or serious injury to a person on a vessel, or imminent loss of the vessel itself. Previously, the common practice of generating a distress signal was by using signal flags, distress flares, meteor rockets and/or smoke flares. However, certain of these devices are difficult to store in a marine environment as the devices are likely ruined when wet. Furthermore, the devices are hazardous to ignite in a marine vessel because they may inadvertently misfire and injure individuals or the vessel, placing the vessel in a more perilous state. Additionally, many of the common distress devices must be replaced every 42 months, requiring the marine vessel operator to constantly remember to replace the devices and to repeatedly incur the expense of doing so. The distress section of the present signaling device advantageously overcomes these problems.

Figure 6:
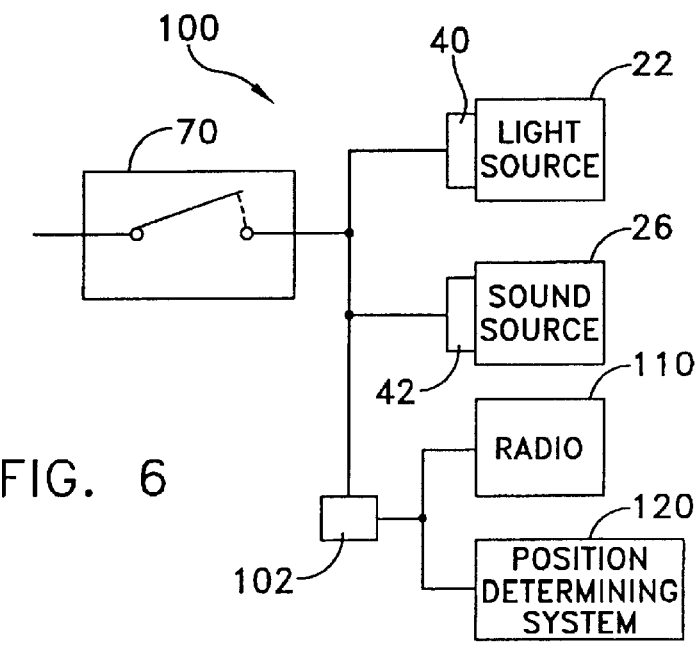
FIG. 6 is a schematic block diagram of the distress section of the signaling device of the present invention.

FIG. 6 displays a schematic block diagram of the distress section 100 of signaling device 20. Distress section 100 comprises a distress actuator 70 selectively connectable to said sound controller 42 which is capable of generating a distress sound signal. The distress actuator 70 may be a manually depressable and device such as those discussed in connection with the danger section and may be positioned on selection actuator 35 located by steering wheel 34. In a preferred embodiment, the distress actuator 70 depressable switch is mounted on the control panel 36. Advantageously, positioning the distress actuator 70 depressable switch located on the control panel 36 allows for quick activation in distress situations. Moreover, the location of the distress actuator 70 depressable switch on the control panel 36 is highly visible to the operator of the marine vessel.

The light controller 40 detects the depression of the distress actuator 70 and continuously and repeatedly generates a predetermined light signal. In a preferred embodiment, the distress light signal comprises a light signal which is actuated from about fifty to about seventy times per minute. The distress sound and light signals will continue until the distress actuator 70 is depressed a second time.

The distress section 100 of the signaling device 20 may also advantageously include a distress controller 102 that is connected to the marine vessel radio 10 and a position determining system 120. The distress controller 102 automatically acquires the marine vessel's 10 current position al data from the position determining system 120, adjusts the marine vessel radio 110 to an emergency frequency band, and communicates to the Coast Guard and nearby marine vessels an emergency broadcast message, positional data and identification information for the equipped vessel. Advantageously, the distress controller 102 effectuates an automatic distress communication that will likely serve to ensure that a marine vessel in a distress situation will be dealt with quickly, effectively and in a manner that ensures passenger and vessel safety. The distress section 100 of the signaling device 20 also provides an efficient way to communicate a marine vessel's distress situation without a great deal of assistance from the operator or passengers of the vessel, many of whom may be unable to communicate such information.

Figure 7:
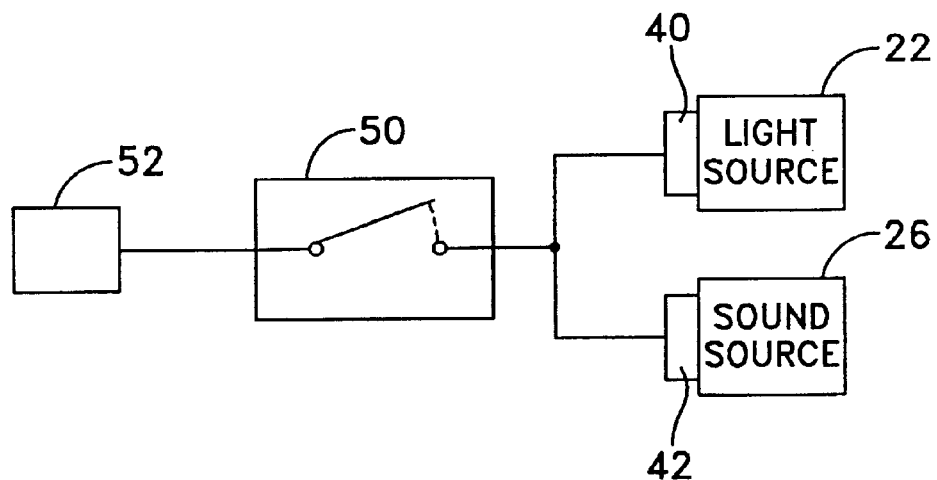
FIG. 7 is a schematic block diagram of the stern propulsion section of the signaling device of the present invention.

Turning now to FIG. 7, there is shown a schematic block diagram of the stern propulsion section 50. The stern propulsion section 50 may be included in the signaling device 20 to automatically render a stern propulsion signal when the vessel is operating astern propulsion. The stern propulsion signal advantageously notifies other vessels of a marine vessel's maneuvering intentions.

The stern propulsion section 50 of the signaling device 20 provides a link between the transmission shift 52, and the sound source 26 and light source 22. The sound controller 42 and light controller 40 detect when the transmission shift 52 is positioned for stern propulsion (e.g., in reverse), and generates a predetermined stern propulsion signal. The stern propulsion signal of the signaling device 20 comprises three short blasts of said sound source 26 each blast having a duration of approximately one second, and a synchronous light signal from the light source 22 which is approximately equivalent in duration to said stern propulsion sound signal and actuated synchronously therewith.

Figure 9:
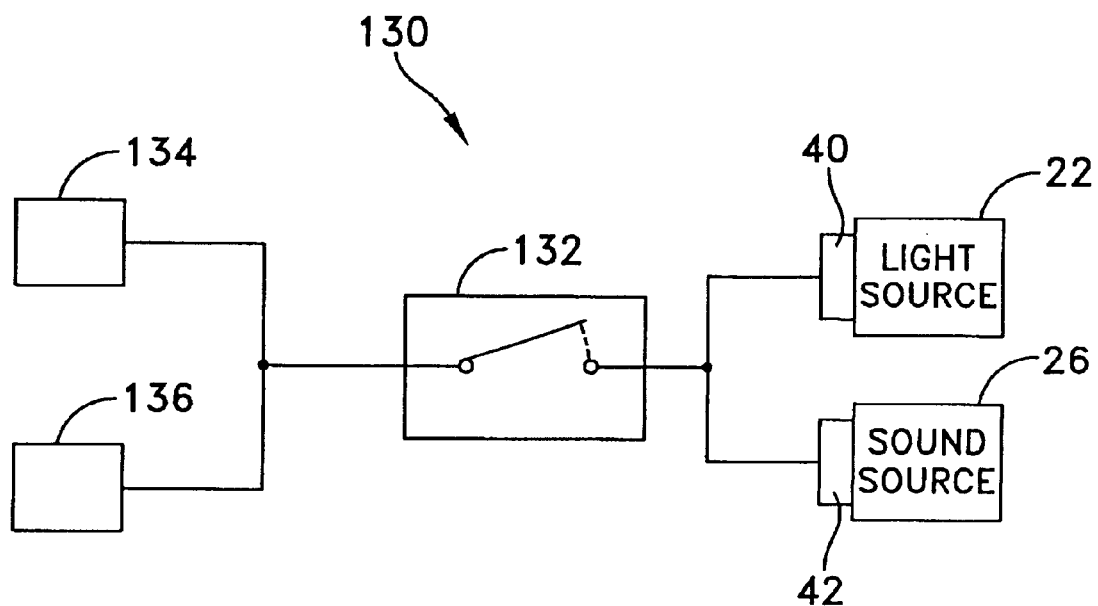
FIG. 9 is a schematic block diagram of the restricted visibility warning section of the present invention.

In accordance with the present invention, the signaling device 20 may also include a restricted visibility section 130 to actuate warning light and sound signals for use in restricted visibility situations. FIG. 9 illustrates the schematic block diagram of the restricted visibility section 130. Restricted visibility situations may include, but are not limited to fog, smoke and haze. When operating at times of restricted visibility such as in fog, smoke or haze, Inland Rules and COLREGS require that navigation lights and sound signals are displayed. The lights let each marine vessel know which vessel is the stand-on or give-way vessel; while the sound signals notify other vessels in the area of the maneuvering situation and intention of the marine vessel 10. The specific warning sound signal in restricted visibility conditions varies with respect to the situation. For example, situations include a power vessel underway, a sailing vessel underway, a power vessel underway but making no way, a vessel at anchor or a vessel aground.

In one embodiment, a photosensor 134, such as those well known in the art, activates the restricted visibility actuator 132 to generate a signal according to the specific situation. The photosensor 134 may be located on the marine vessel in a position that may readily detect restricted visibility situations. Advantageously, the photosensor signal 134 automatically generates the restricted visibility actuator 132 in restricted visibility situations. The photosensor signal 134 ensures that the operator of a marine vessel has the correct navigation lights displayed and or sound signals sounded.

Alternatively, the restricted visibility actuator 132 may be a switch 136 which is manually activated. As previously indicated, the restricted visibility switch 136 may be a depressable switch located on the selection actuator 35 located next to the steering wheel 34. Alternatively, the restricted visibility switch 136 is a depressable switch located on the control panel 36. In addition, an operator of marine vessel may depress manual switch 136 to deactivate the navigation lights that were activated by photosensor signal 134 or by manual switch 136.

The restricted visibility warning sound signal may be actuated in conditions of restricted visibility in accordance with motor boat rules; that is, the restricted visibility warning section 130 actuates the restricted visibility actuator 132 to generate a restricted visibility warning signal comprising one short blast, having a duration of approximately one to two seconds, actuated approximately every two minutes. The restricted visibility warning signal in accordance with power boat rules, will continue to generate a signal until a photosensor 134 detects that the restricted visibility condition has ceased or until the operator of a marine vessel depresses the restricted visibility actuator 132 by means of the restricted visibility manual switch 136.

In another embodiment, the restricted visibility warning signal may be actuated in accordance with sailing vessel rules, so that the restricted visibility warning section 130 actuates the restricted visibility actuator 132 to generate a restricted visibility warning sound signal comprising one prolonged blast, having a duration of approximately one to two seconds, actuated approximately every two minutes. As above, the restricted visibility warning signal will continue to generate a signal until photosensor 134 detects that the restricted visibility condition has ceased or until a marine vessel operator depresses the restricted visibility actuator 132.

In yet another embodiment, the restricted visibility warning signal may be actuated in conditions of restricted visibility in accordance with power boat navigation rules for a vessel underway but making no way wherein said restricted visibility warning section 130 of the signaling device 20 actuates the restricted visibility actuator 132 to generate a restricted visibility warning sound signal. The warning sound signal of this embodiment comprises two prolonged blasts, each having a duration of approximately one to two seconds, actuated approximately every two minutes. The restricted visibility warning signal in accordance with these motorboat rules will continue to generate a signal until photosensor 134 detects that the restricted visibility condition has ceased or until a marine vessel operator depresses the restricted visibility manual switch 136.

In still another embodiment of the restricted visibility warning section 130, the restricted visibility warning signal may be actuated in conditions of restricted visibility in accordance with rules for an anchored vessel wherein said restricted visibility warning section 130 of the signaling device 20 actuates the restricted visibility actuator 132 to generate a restricted visibility warning sound signal. The warning sound signal of this embodiment comprises rapid ringing, having a duration of approximately five seconds, actuated approximately every two minutes. The restricted visibility warning signal in accordance with the rule for a vessel at anchor will continue to generate a signal until photosensor 134 detects that the restricted visibility condition has ceased or until a marine vessel operator depresses the restricted visibility manual switch 136.

In another embodiment, the restricted visibility warning signal may be actuated in conditions of restricted visibility in accordance with rules for a vessel aground wherein said restricted visibility warning section 130 of the signaling device 20 actuates the restricted visibility actuator 132 to generate a restricted visibility warning sound signal. The warning sound signal of this embodiment comprises three short bell strokes, each having a duration of approximately one to two seconds, followed by rapid ringing having a duration of approximately 5 seconds, followed by three additional short bell strokes, each having a duration of approximately one to two seconds, actuated approximately every two minutes. The restricted visibility warning signal in accordance with the rules for vessels aground in restricted visibility conditions will continue to generate a signal until photosensor 134 detects that the restricted visibility condition has ceased or until the marine vessel 10 operator depresses the restricted visibility manual switch 136.

Figure 10:
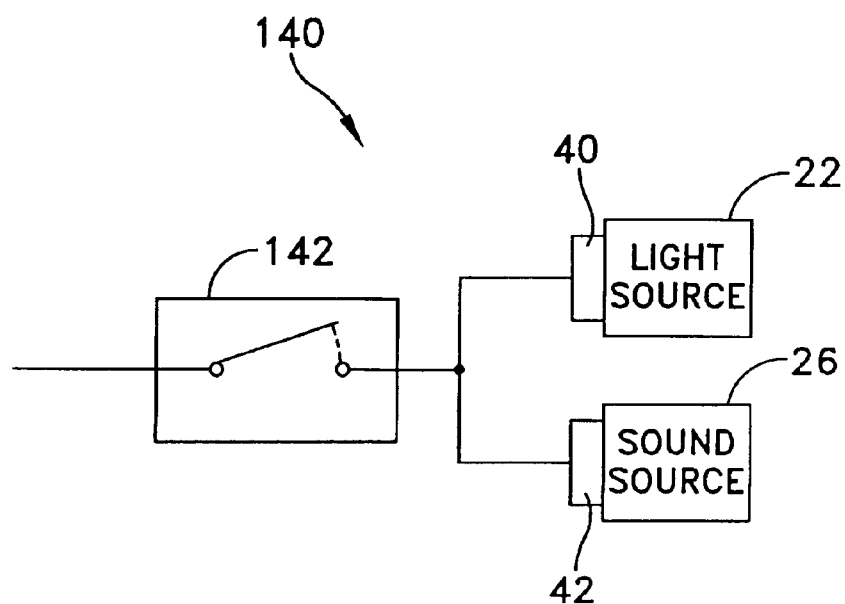
FIG. 10 is a schematic block diagram of the towing section of the present invention.

The signaling device 20 may further comprise a towing signal section 140 for use in towing situations. FIG. 10 shows a schematic block diagram of the towing signal section 140 of the signaling device 20. The towing signal section 140 of the signaling device 20 comprises a towing actuator 142 selectively connectable to said light controller 40 which is capable of generating a special towing light signal. The towing actuator 142 may be a depressable switch located on the section actuator 35 next to the steering wheel 34 or, it may be a manually depressable switch such as a momentary switch or a membrane switch mounted on the control panel 36. Advantageously, the towing signal section 140 will enable the operator of a marine vessel to display the proper light and or sound signal necessary for a towing situation. The proper light and or sound signal depends on several different variables attendant in a towing situation such as if the vessel is towing upstream, is partially submerged or there is a restricted visibility situation.

Figure 11:
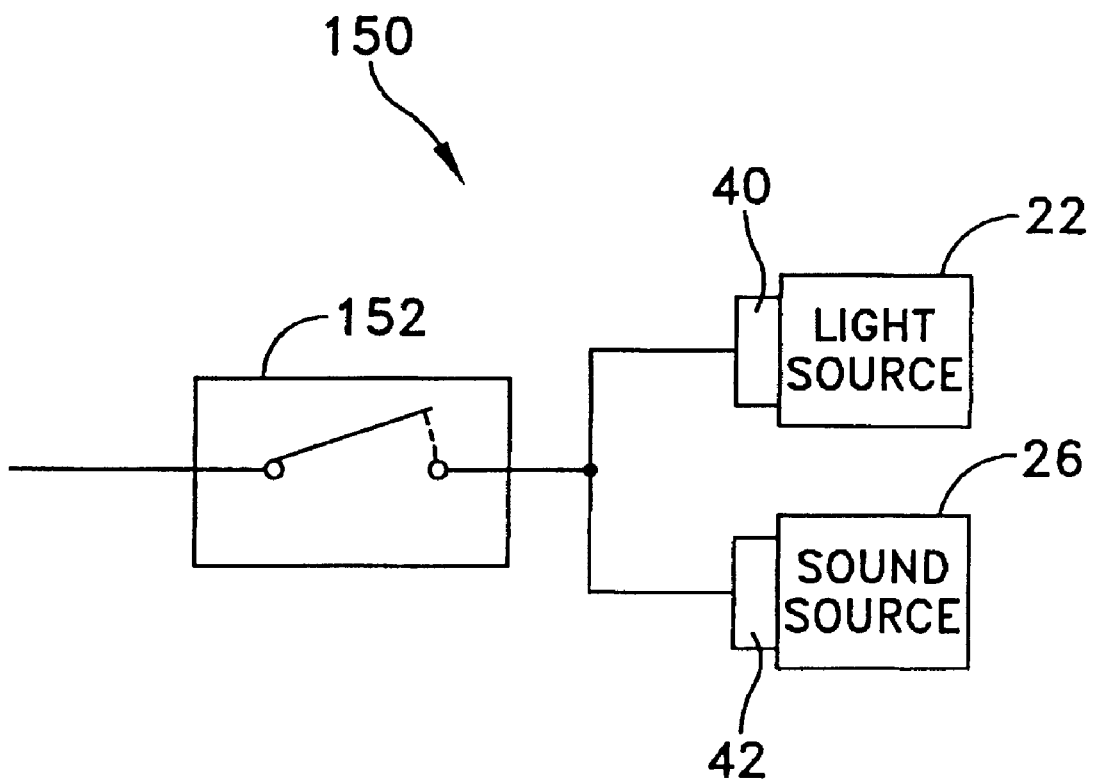
FIG. 11 is a schematic block diagram of the anchoring section of the present invention.

Turning now to FIG. 11, there is shown a broad schematic diagram of an anchoring section 150 of the signaling device 20 for use in anchoring situations. The anchoring section 150 of the signaling device 20 comprises an anchor actuator 152 selectively connectable to said sound controller 42 and said light controller 40 which is capable of generating an anchor sound signal and an anchor light signal. The requisite anchor sound signals and anchor light signals vary depending on the anchoring situation such as in a restricted visibility situation or when anchored for recreation. The anchoring actuator 152 is a depressable switch located on the section actuator 35 located next to the steering wheel 34. Alternatively, the anchoring actuator is located on the control panel 36 in the form of a manually depressable switch.

Having thus described the invention in rather full detail, it will be recognized that such detail need not be strictly adhered to but that various changes and modifications may suggest themselves to one skilled in the art, all falling within the scope of the invention, as defined by the subjoined claims.

What is claimed is:

1. A signaling device for a marine vessel comprising:
   a sound source;
   a directional actuator movable to a first position to indicate a first vessel maneuver and to a second position to indicate a second vessel maneuver; and
   a sound controller; selectively connectable to said sound source and to said directional actuator, said sound controller generating a first predetermined sound signal indicative of said first maneuver when said directional actuator is moved to said first position, for audibly signifying said first maneuver to other vessels, and generating a second predetermined sound signal, different from said first sound signal and indicative of said second maneuver, when said directional actuator is moved to said second position, for audibly signifying said second maneuver to other vessels.

2. A signaling device as recited by claim 1 additionally comprising:
   a light source; and
   a light controller selectively connectable to said light source and to said directional actuator, said light controller generating a first light signal when said directional actuator is moved to said first position and generating a second light signal when said directional actuator is moved to said second position.

3. A signaling device as recited by claim 2 wherein said light source and said sound source are synchronously actuated.

4. A signaling device as recited by claim 2, wherein said first sound signal comprises one short blast and has a duration of approximately one second, said first light signal is approximately equivalent in duration to said first sound signal and said sound source and said light source are synchronously actuated.

5. A signaling device as recited by claim 2, wherein said second sound signal comprises two short blasts each having a duration of approximately one second, said second light signal is approximately equivalent in duration to said second sound signal and said sound source and said light source are synchronously actuated.

6. A signaling device as recited by claim 2, wherein said first sound signal comprises two prolonged blasts and one short blast, each prolonged blast having a duration ranging from about four to about six seconds and each short blast having a duration of approximately one second, said first light signal is approximately equivalent in duration to said first sound signal and said sound source and said light source are synchronously actuated.

7. A signaling device as recited by claim 2, wherein said second sound signal comprises two prolonged blasts and two short blasts of said sound source, each prolonged blast having a duration ranging from about four to about six seconds and each short blast having a duration of approximately one second, said second light signal is approximately equivalent in duration to said second sound signal and said sound source and said light source are synchronously actuated.

8. A signaling device as recited by claim 2, further comprising a danger actuator selectively connectable to said sound controller and to said light controller which is capable of generating a danger sound signal and a danger light signal.

9. A signaling device as recited by claim 8, wherein said danger sound signal comprises five short blasts, each having a duration of approximately one second, said danger light signal is approximately equivalent in duration to said danger sound signal and said sound source and said light source are synchronously actuated.

10. A signaling device as recited by claim 2, further comprising a distress actuator selectively connectable to said light controller which is capable of generating a distress light signal.

11. A signaling device as recited by claim 10, wherein said distress light signal comprises a light signal which is actuated from about fifty to about seventy times per minute.

12. A signaling device as recited by claim 2, wherein said signaling device generates a stern propulsion signal when the vessel is operating astern propulsion.

13. A signaling device as recited by claim 12, wherein said stern propulsion signal comprises three short blasts of said sound source each blast having a duration of approximately one second, and a reversing light signal which is approximately equivalent in duration to said stern propulsion signal and actuated synchronously therewith.

14. A signaling device as recited by claim 2, further comprising a restricted visibility actuator for use in restricted visibility conditions, selectively connectable to said sound controller and to said light controller which is capable of generating a restricted visibility warning sound signal and a restricted visibility light signal.

15. A signaling device as recited by claim 14, wherein said restricted visibility actuator comprises a photo sensor for use in detecting limited visibility conditions, selectively connectable to said sound controller and to said light controller which is capable of generating a restricted visibility warning sound signal and a restricted visibility light signal.

16. A signaling device as recited by claim 14 wherein said restricted visibility warning sound signal comprises one short blast, having a duration of approximately one to two seconds, actuated approximately every two minutes.

17. A signaling device as recited by claim 14 wherein said restricted visibility warning sound signal comprises one prolonged blast, having a duration of approximately four to six seconds, followed by two short blasts, having a duration of approximately one to two seconds, actuated approximately every two minutes.

18. A signaling device as recited by claim 2, further comprising a towing signal for use in towing situations, selectively connectable to said sound controller and to said light controller which is capable of generating a towing sound signal and a towing light signal.

19. A signaling device as recited by claim 2, further comprising an anchor actuator for use in anchoring situations, selectively connectable to said sound controller and to said light controller which is capable of generating an anchor sound signal and an anchor light signal.

20. A signaling device as recited by claim 1 wherein said directional actuator comprises a lever extending from a steering column of a vessel steering wheel, said lever being movable to said first position from a neutral position and to said second position from said neutral position.

* * * * *